United States Patent
Abenroth et al.

(10) Patent No.: US 7,237,620 B2
(45) Date of Patent: Jul. 3, 2007

(54) ELECTRIC GARDEN TILLER

(75) Inventors: Jon M. T. Abenroth, Bowling Green, KY (US); David B. Fisher, Bowling Green, KY (US)

(73) Assignee: Desa IP, LLC, Miami, FL (US)

( * ) Notice: Subject to any disclaimer, the term of this patent is extended or adjusted under 35 U.S.C. 154(b) by 0 days.

(21) Appl. No.: 10/094,765

(22) Filed: Mar. 11, 2002

(65) Prior Publication Data

US 2003/0178208 A1    Sep. 25, 2003

(51) Int. Cl.
*A01B 33/00*    (2006.01)
(52) U.S. Cl. .......................... 172/42; 172/15
(58) Field of Classification Search ............... 172/43, 172/42, 15, 40, 41
See application file for complete search history.

(56) References Cited

U.S. PATENT DOCUMENTS

| | | | | |
|---|---|---|---|---|
| 2,246,832 A * | 6/1941 | Becker | ......................... | 15/413 |
| 2,633,789 A * | 4/1953 | Ober | ........................... | 172/42 |
| 3,040,590 A * | 6/1962 | Smithburn | ..................... | 74/16 |
| 3,123,149 A * | 3/1964 | White | .......................... | 172/42 |
| 3,603,162 A * | 9/1971 | Gohler | .......................... | 74/16 |
| 3,668,847 A * | 6/1972 | Van Ausdall | ................ | 56/252 |
| 3,673,715 A * | 7/1972 | Lines | .......................... | 37/251 |
| 3,805,385 A * | 4/1974 | Ritums et al. | ................ | 30/220 |
| 4,096,915 A * | 6/1978 | Groth | .......................... | 172/42 |
| 4,164,983 A * | 8/1979 | Hoch | .......................... | 172/43 |
| 4,321,969 A * | 3/1982 | Wilson | ......................... | 172/42 |
| 4,567,949 A | 2/1986 | Herscher | | |
| 4,739,850 A * | 4/1988 | Fujioka | ..................... | 180/19.3 |
| 4,776,405 A * | 10/1988 | Grieder et al. | ................ | 172/42 |
| 4,899,471 A * | 2/1990 | Sasaki et al. | .................. | 37/233 |
| 5,251,428 A * | 10/1993 | Gay | .......................... | 56/16.7 |
| 5,263,304 A * | 11/1993 | Fassauer | ..................... | 56/12.8 |
| 5,287,770 A * | 2/1994 | Mudd | ........................ | 74/606 R |
| 5,562,166 A * | 10/1996 | Griffin | ......................... | 172/42 |
| 5,696,358 A * | 12/1997 | Pfordresher | ................. | 181/198 |
| 5,896,931 A | 4/1999 | Roberts et al. | | |
| 6,092,608 A * | 7/2000 | Leger | .......................... | 172/15 |
| 6,415,588 B1 * | 7/2002 | Kao | .......................... | 56/16.7 |
| 6,543,560 B1 * | 4/2003 | Trefz et al. | | |

FOREIGN PATENT DOCUMENTS

GB    2139329    *    3/1983

* cited by examiner

*Primary Examiner*—Thomas B. Will
*Assistant Examiner*—Alicia Torres
(74) *Attorney, Agent, or Firm*—James E. Cole; Middleton Reutlinger

(57) ABSTRACT

An electric garden tiller is disclosed. The tiller is light weight, compact and easy to use. The tiller includes a two stage speed reduction transmission and an aluminum transmission housing. Connected to the transmission housing are a main housing and electric motor, a fender, a tine shaft and four tine assemblies, a rotatable wheel assembly and a foldable handle. Connected to the handle is a safety switch mechanism requiring two simultaneous actions to activate the motor. Once activated, if an operator's hand is removed, the motor will stop.

12 Claims, 8 Drawing Sheets

ELECTRIC GARDEN TILLER

BACKGROUND OF THE INVENTION

1. Field of the Invention

The present invention relates to an electric tiller and more particularly to an electric garden tiller which is lightweight, easy to use, quiet and pollution free.

2. Description of the Related Art

Consumer type tillers for use in gardens and the like are well known. For example, see U.S. Pat. Nos. 4,567,949; 5,251428; 5,896,931; and 6,092,608. These tillers include a gasoline powered internal combustion engine, a transmission, a tine shaft bearing a number of tines, an operating handle and a set of wheels. These products tended to be noisy, sources of pollution, heavy and difficult to use.

The market has also seen electric rotary tillers, such as the POWER-TILL brand, sold by the assignee of the present application. These were quieter and non-polluting, however, they too tended to be heavy and somewhat difficult to use.

Efforts are still being made, in spite of the numerous prior attempts, to provide a more consumer and environmentally friendly tiller.

BRIEF SUMMARY OF THE INVENTION

The difficulties encountered with previous tiller devices have been overcome by the present invention. What is described here as an example of the invention is an electric garden tiller that includes a main housing, an electric motor mounted within the housing, a transmission connected to the motor where the transmission includes a two stage speed reduction arrangement including a small drive gear engaged to a large driven gear which in turn is engaged to a worm shaft, the worm shaft engaged to a worm gear and the worm gear engaged to a driven worm wheel, a tine shaft, at least one tine mounted to the shaft, a handle connected to the housing and a two step safety switch for operating the electric motor of the tiller.

There are a number of advantages, features and objects achieved with the present invention which are believed not to be available in earlier related devices. For example, some advantages of the present invention are tillers that are quiet, strong, and long lasting. Another object of the present invention is to provide a tiller which is compact and easy to use. A further advantage of the present invention is the provision of a tiller which is safe to use. Another feature of the present invention is to provide a tiller which is easy to carry and easy to store and ship. Still another object of the present invention is to provide a tiller with the foregoing features and the like that is non-polluting.

A more complete understanding of the present invention and other objects, advantages and features thereof will be gained from a consideration of the following description of a preferred embodiment read in conjunction with the accompanying drawing provided herein. The preferred embodiment represents an example of the invention which is described here in compliance with Title 35 U.S.C. section 112, but the invention itself is defined by the attached claims.

DETAILED DESCRIPTION OF A PREFERRED EMBODIMENT OF THE INVENTION

While the present is open to various modifications and alternative constructions, the preferred embodiment shown in the drawing will be described herein in detail. It is understood, however, that there is no intention to limit the invention to the particular embodiment, form or example disclosed. On the contrary, the intention is to cover all modifications, equivalent structures and methods, and alternative constructions falling within the spirit and scope of the invention as express in the appended claims, pursuant to Title 35 U.S.C. section 112 (second paragraph).

Figure 1:
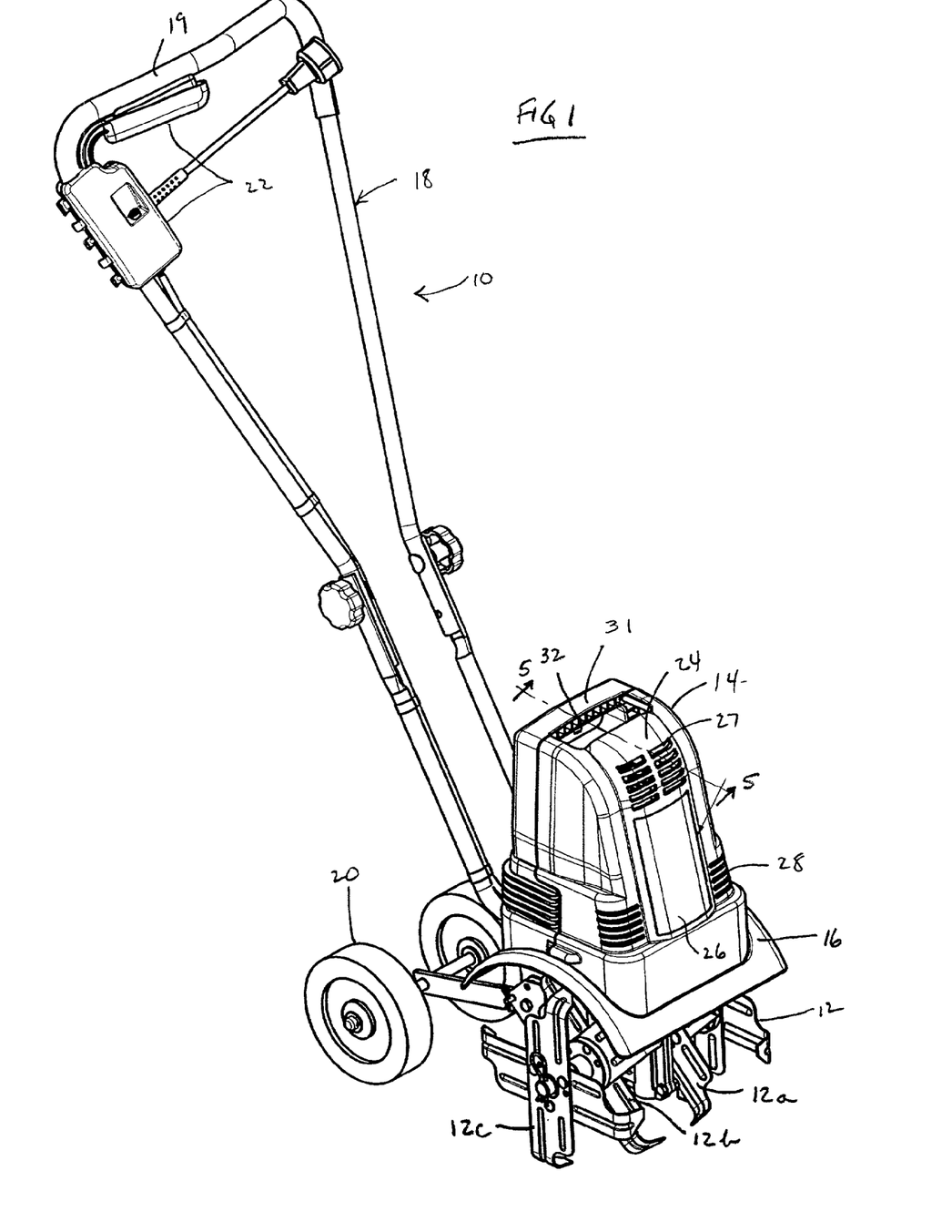
FIG. 1 is a front isometric view of an electric garden tiller as it would appear in operating mode.
Figures 2, 3:
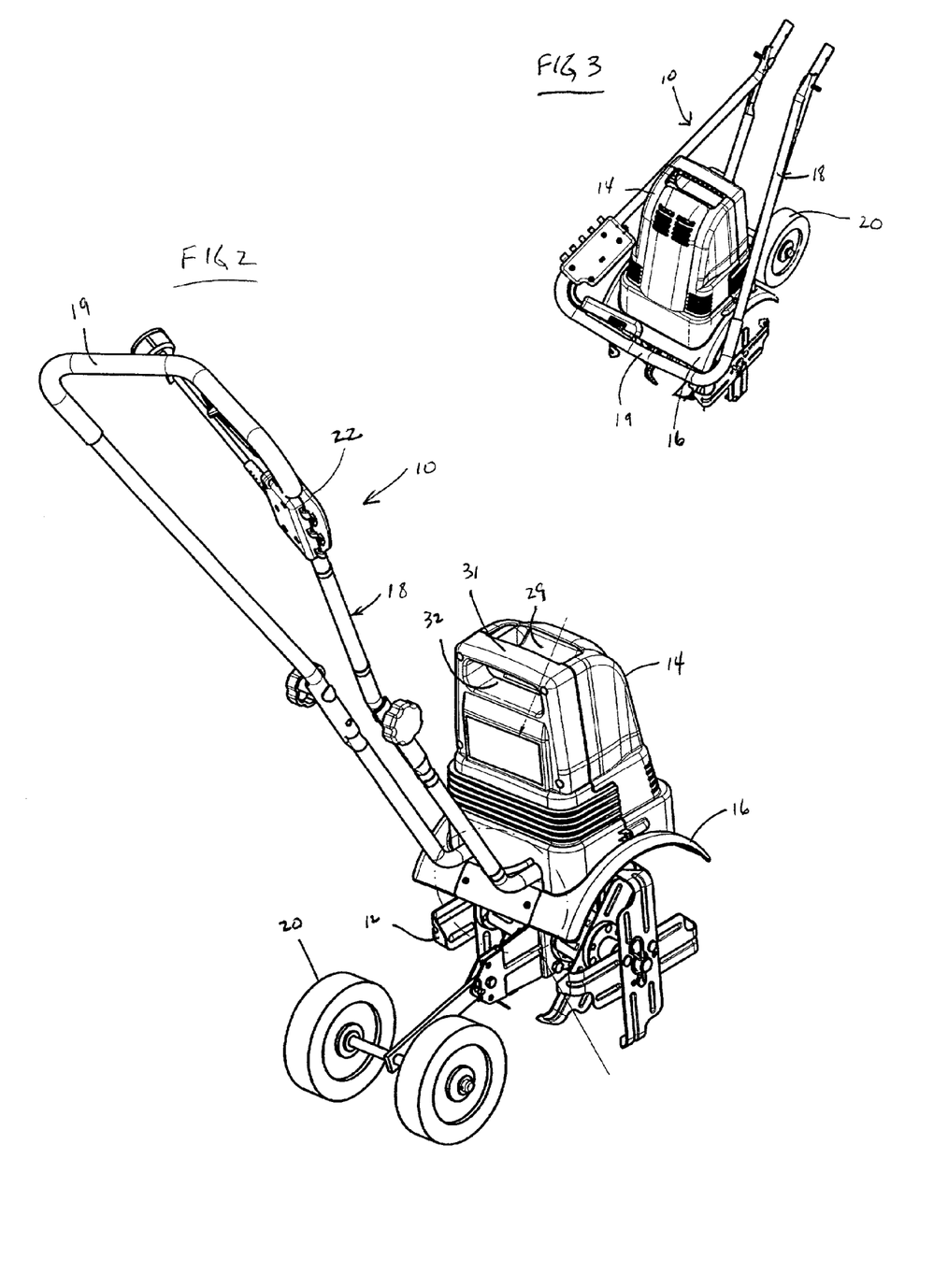
FIG. 2 is a rear isometric view of the electric garden tiller shown in FIG. 1.
FIG. 3 is a front isometric view of the electric garden tiller in shipping mode.

Referring now to FIGS. 1 and 2, there is illustrated the electric garden tiller 10 having four tine assemblies 12, 12a, 12b, 12c. These tines are driven by an electric motor which will be described below and which is covered by a main housing 14. Between the main housing 14 and the tines is a curved fender 16. Extending away from the tines is a handle 18 having a generally horizontal, padded, top portion 19 which is gripped by a user during operation. A wheel assembly 20 is provided for transportation. Attached to and near the top portion 19 of the handle is a safety switch mechanism 22 for operating the electric motor in a safe and convenient manner. The tiller 10 is shown in transportation mode in FIGS. 1 and 2 where the handle is extended upwardly and the wheel assembly is lowered. In FIG. 3, the tiller is shown in a shipping mode where the handle is folded down and the wheel assembly is pivoted upwardly. In operating mode, the handle is extended and the wheel assembly is pivoted upwardly and secured.

As mentioned earlier, the electric garden tiller 10 is quiet, lightweight and compact. This may begin to be appreciated by also referring to FIG. 4, an exploded view of the tiller. As can be seen the main housing 14 comprises a front portion 14a and a rear portion 14b. The front portion includes an upper portion 24 and a lower portion 26. Formed in the upper portion are a first or upper series of air vents or openings 27 that allow ambient air to flow to and through the electric motor. In the lower portion 26 of the main housing there is a second or lower set of vents or openings 28 to exhaust the ambient air which has passed through and cooled the electric motor. The main housing also includes an upper wall or air dam 29 mounted to the front and rear housing portions to downwardly direct the incoming air from the air vents 27. The main housing may be made of any suitable material such as a synthetic resin and each portion may be molded as an integral piece making the main housing relatively inexpensive, easy to assemble and durable.

The rear portion 14b of the main housing has an upper portion 30. Formed in the upper portion of the main housing rear portion is a tote handle 31 with a hand slot 32, FIGS. 1, 2 and 5. The handle allows a user to transport the tiller in an easy and effective manner.

Located within the housing is the electric motor 34 including a the motor housing 36 with top vents 37 and a field and armature combination 38. Also included is a fan 40 which pulls air through the motor housing top vents. The motor is supported on and attached to a bearing plate 44 so that a motor shaft 46 extends through an opening 48, FIGS. 4 and 7.

Figure 4:
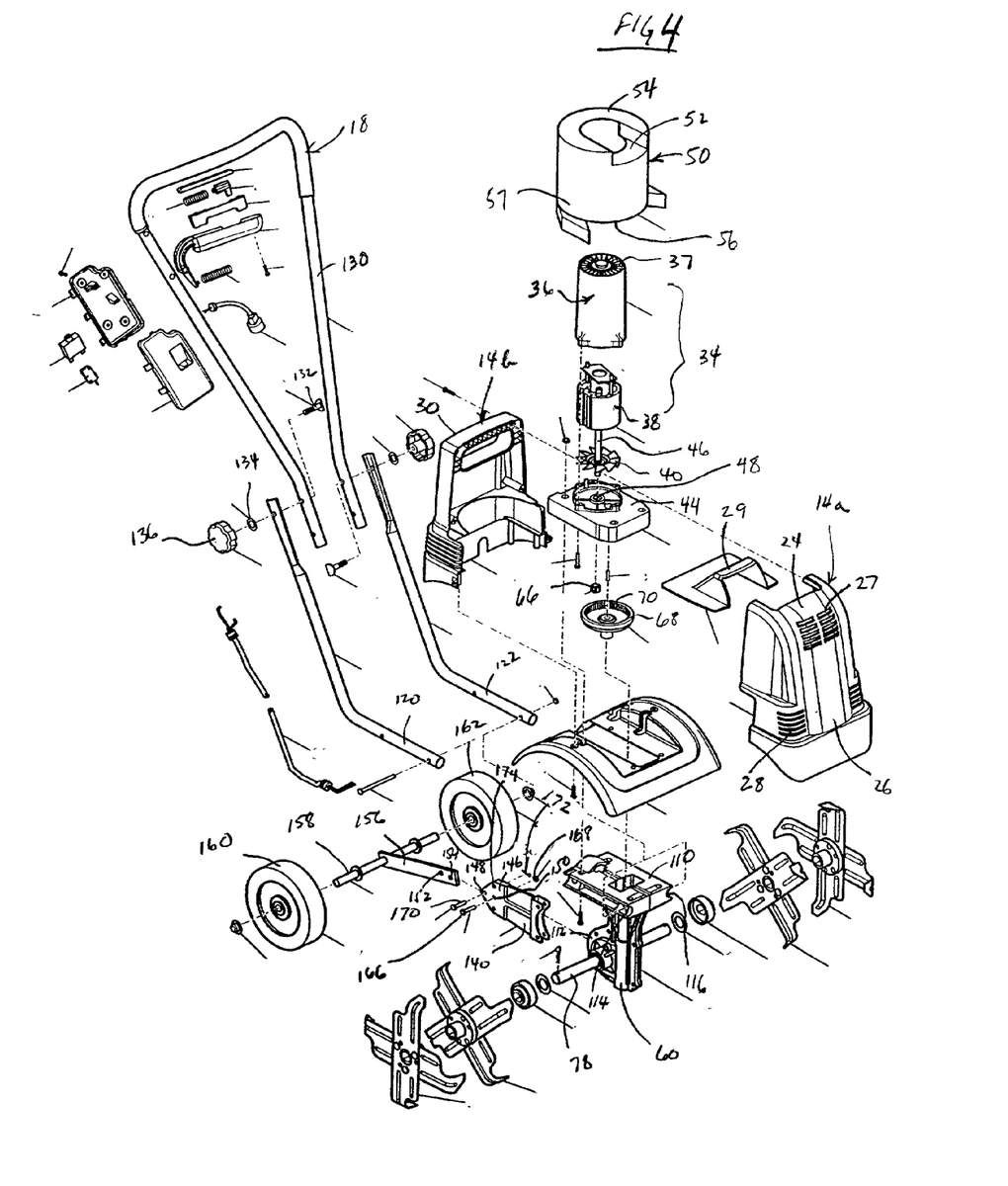
FIG. 4 is an exploded front isometric view of the electric garden tiller shown in FIGS. 1 and 2.
Figure 5:
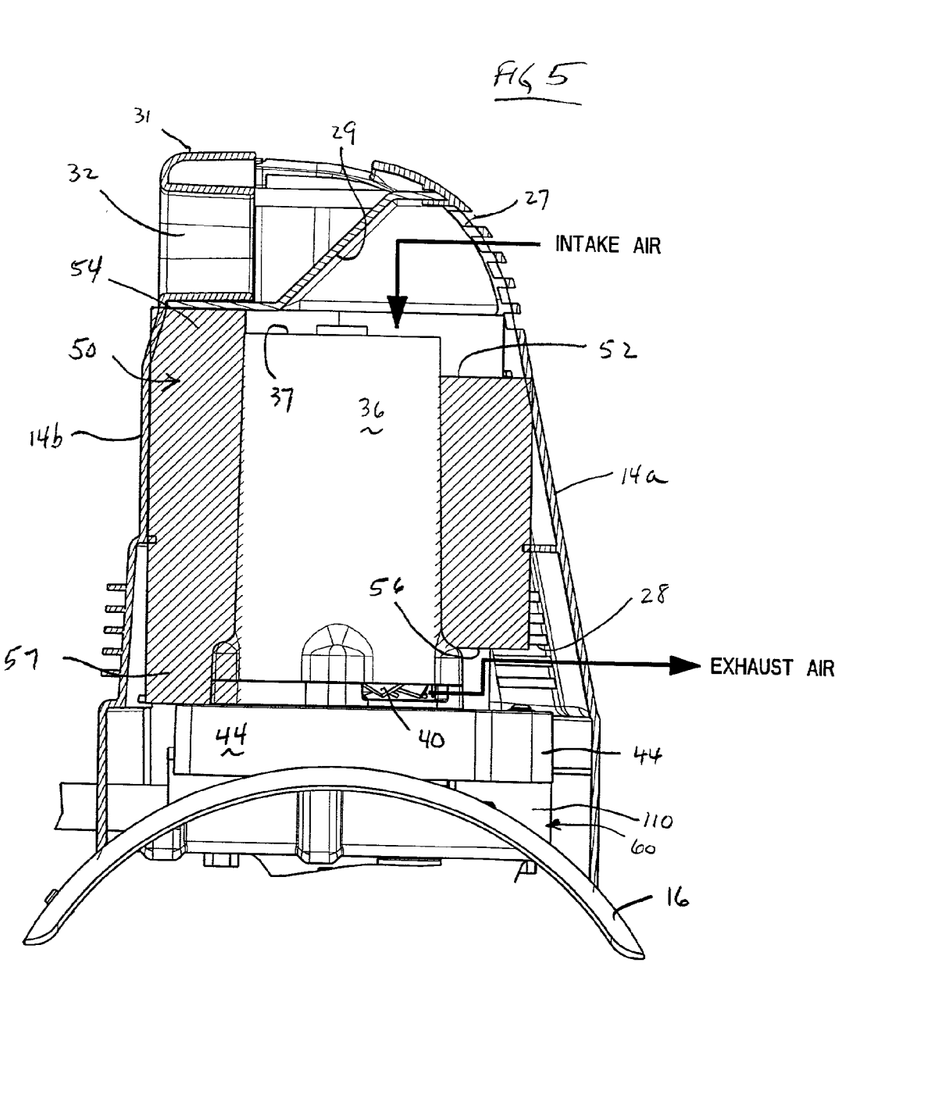
FIG. 5 is an enlarged sectional elevation view taken along line 5—5 of FIG. 1.

To help quiet the tiller, a sound insulative sleeve 50, FIGS. 4 and 5, is fitted around the motor housing 36. The sleeve 50 may be made of sound-attenuating foam. A slot 52 is provided at an upper portion 54 of the sleeve and another slot 56 is provided at a lower portion 57 of the sleeve. In this way, air which is sucked through the upper vents 27 is deflected by the wall 29 and caused to enter the upper slot 52 where it passes through the top vents 37 in the motor housing, between the armature-field 38 before exhausting through the lower slot 56 and lower vents 28. Having the ambient air flow in and out through the front portion of the main housing also helps quiet the tiller because the main housing also shields the motor and because air flow and accompanying sound waves are directed as far away from the operator as possible.

Figures 6, 7:
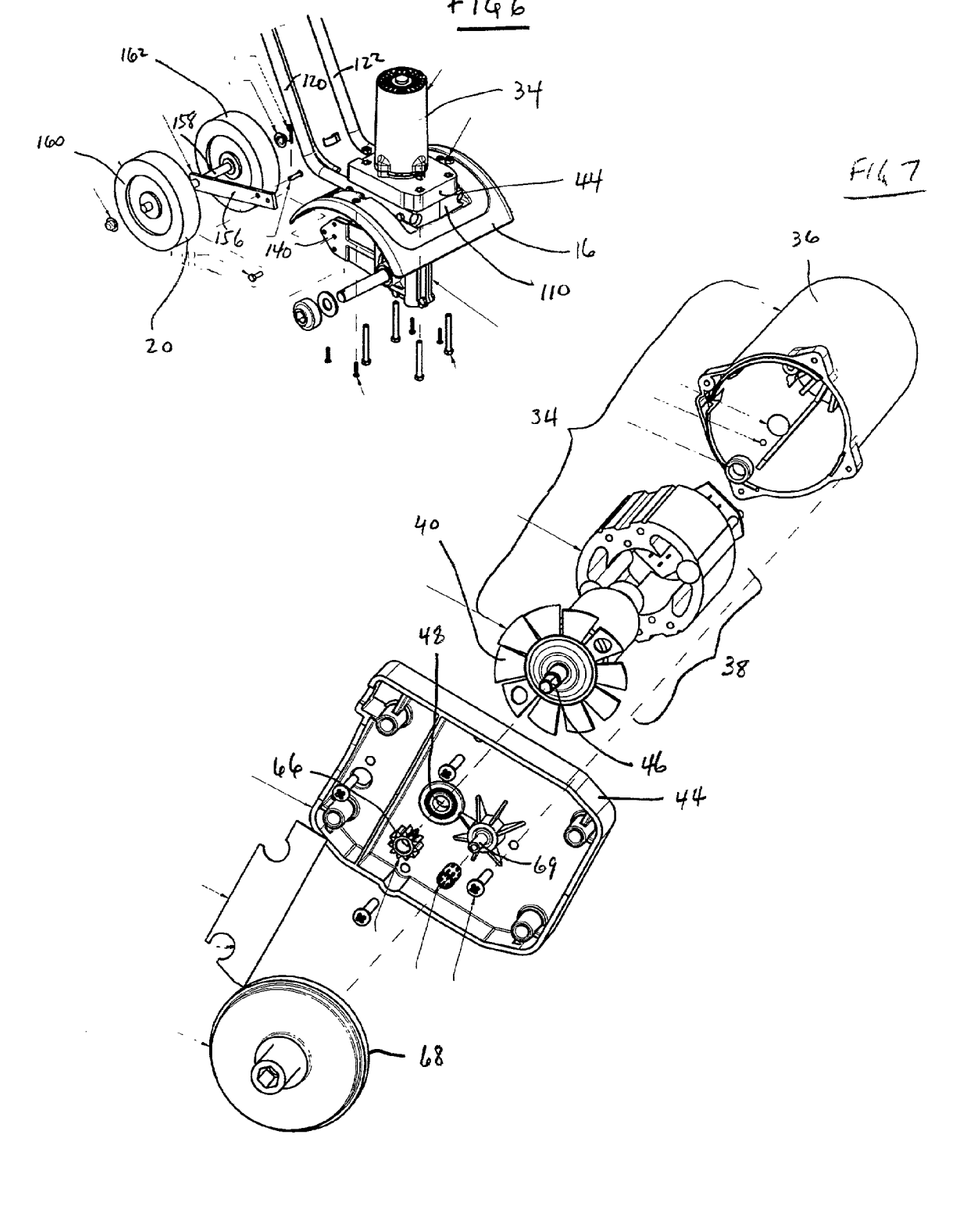
FIG. 6 is a partially exploded front isometric view of a portion of the electric garden tiller shown in FIGS. 1–4.
FIG. 7 is an exploded isometric view of an electric motor, a bearing plate, and a first stage speed reduction gear set including a drive gear and a driven gear.
Figure 8:
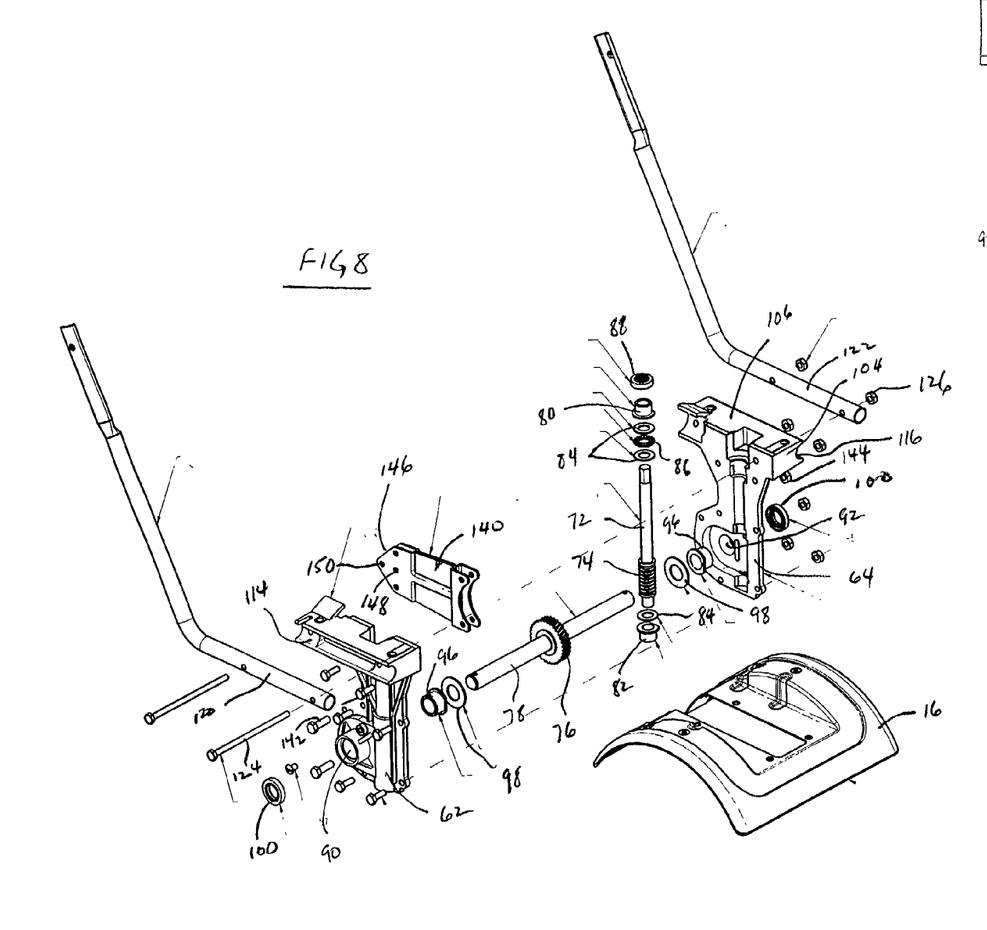
FIG. 8 is an exploded front isometric view of a second stage speed reduction gear set including a worm gear and a driven spur gear, and also a transmission housing, a fender, the lower portion of a handle, a wheel assembly bracket and a tine shaft.

The transmission for the tiller includes the bearing plate 44, a transmission housing 60, FIGS. 4, 7 and 8, and the gears. The transmission housing is formed of aluminum and is made in two parts, a first part 62 and a second part 64. The transmission is a two stage speed reduction arrangement in which the first stage includes a small drive gear 66 mounted directly to the motor shaft 46. Engaging the small drive gear is a larger driven gear 68 having internal gear teeth 70. The driven gear 68 is mounted on a shaft 69 integral with the bearing plate 44. The small drive gear and driven gear combination provides a 5.36:1 speed reduction. The driven gear 68 is also attached to a worm shaft 72 having a worm or worm gear 74. The worm gear in turn engages a driven worm wheel or spur gear 76 which is attached to a tine shaft 78. The speed reduction between the worm gear and the driven spur gear is 32:1.

Figure 9:
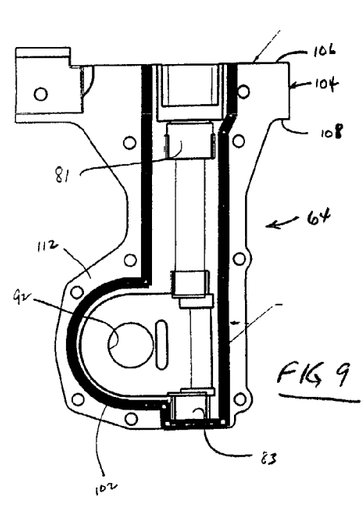
FIG. 9 is an enlarged elevation view of one part of the transmission housing.

As shown, suitable bushings 80, 82, FIG. 8, are used to mount the generally vertically disposed worm shaft in the transmission housing at recesses 81, 83, FIG. 9, accompanied by thrust washers 84, a thrust roller bearing 86 and a seal 88. The tine shaft 78 is generally horizontally disposed and is received by openings 90, 92 in the transmission housing parts 62, 64 and also is supported by bushings 96, thrust washers 98 and seals 100. As shown in FIG. 9, a seal 102 is provided along the sides and bottom of the worm shaft 72 and the driven spur gear 76 which together with the tine shaft seals 100 and the worm shaft seal 88 protects the transmission and its lubrication and makes the transmission very robust. The transmission/transmission housings are light weight, compact and very strong. It may now be appreciated that the transmission housing forms the core of the tiller to which every other element is attached. Relatively few parts are used and assembly is simplified.

The transmission housing includes an upper flange 104, FIGS. 4, 8 and 9, with top and bottom surfaces 106 108, and a rear flange 112. The bearing plate 44 is fastened and sealed to the top surface 106 of the upper flange 104 of the transmission housing 60 and the fender 16 is attached at the bottom surface 108 of the upper flange. The upper flange also includes oppositely disposed horizontal annular recesses 114, 116. These recesses receive lower support portions 120, 122 of the handle 18. The support portions 120, 122 may be fastened to the transmission flange 104 by bolts, such as the long bolt 124 extending through aligned openings in the support portions and the transmission housing and are secured by a nut, such as the nut 126. See FIG. 6. The support portions 120, 122 extend upwardly to connect to a inverted U-shaped upper portion 130 of the handle 18. Connecting the lower support portions and the upper portion are any suitable fasteners, such as a saddle head bolt 132, FIG. 4, a lock tooth washer 134 and a handle knob 136. As can now be appreciated, by extending the handle and tightening the handle knob, the handle takes the position as shown in FIG. 1 where it is in its extended position for use by an operator. By loosening the handle knob, the upper portion 130 may be rotated about the bolt 132 so that the upper portion 130 is folded downwardly for storage or shipping as shown in FIG. 3.

Connected to the peripheral flange 112 of the transmission housing is a wheel assembly bracket 140, FIGS. 4, 6 and 8. The bracket may be connected by any suitable fasteners, such as a bolt 142 and a nut 144. At an extended end 146 of the bracket, there are two openings 148, 150 for aligning with two openings 152, 154 of a link 156, FIG. 4, which is part of the wheel assembly 20. The link in turn is connected to an axle 158 to which wheels 160, 162 are mounted. The link 156 may be pivotally connected to the bracket 140 by a bolt 166, and nut 168 combination which fit through aligned opening 154 in the link and opening 150 in the bracket. A pin 170 is used to maintain the wheel assembly in a lowered use position by passing through aligned opening 152 in the link and opening 148 in the bracket. A cotter 172 may be used to maintain the pin 170 within the openings 148, 152. The lowered position of the wheel assembly is shown in FIGS. 1 and 2. For purposes of storage and/or shipping and during use, the wheel assembly 20 is rotated upwardly around the bolt 166 by removing the pin 170 to allow upward rotation of the link 156 until the opening 152 aligns with another opening 174 in the bracket. The pin 170 may then be inserted in the aligned openings 152, 174 to maintain the link 156 in an upward position. The cotter may be reinserted in the pin to restrain the wheel assembly in the raised position. The tiller is shown in a shipping position in FIG. 3.

Referring now to FIGS. 10–14, the safety switch mechanism 22 is shown in detail. This switch mechanism is an example of safety means for operating the electric motor and thereby rotating the tines. To prevent inadvertent activation of the motor, the safety switch mechanism requires a simultaneous two step operation.

Figure 10:
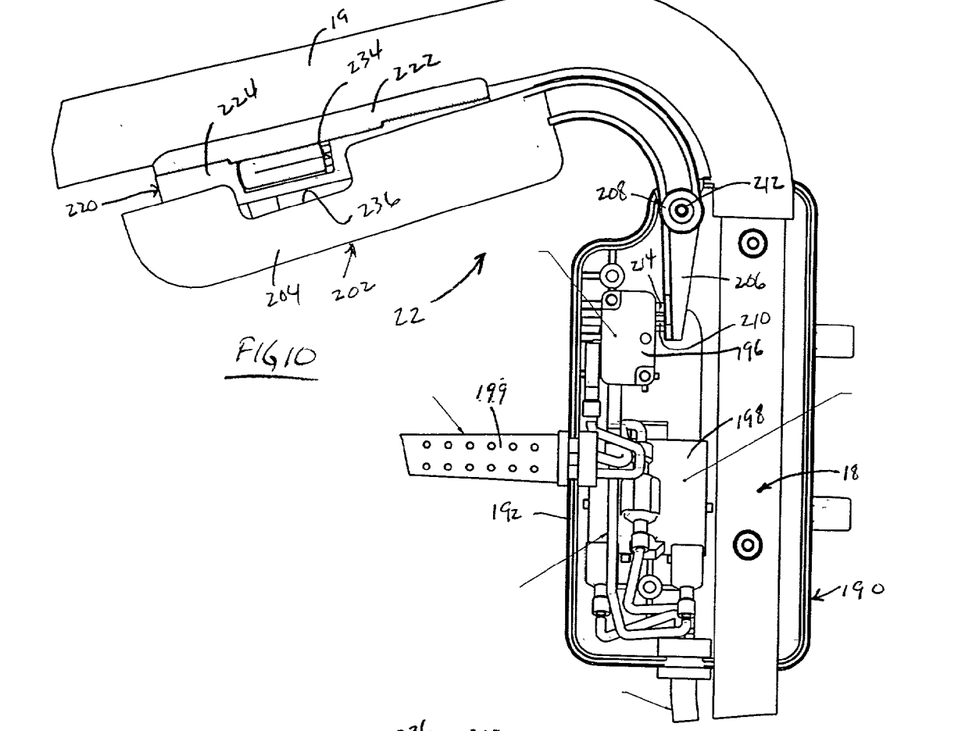
FIG. 10 is an elevation view of a safety switch mechanism for operating the electric motor.
Figure 11:
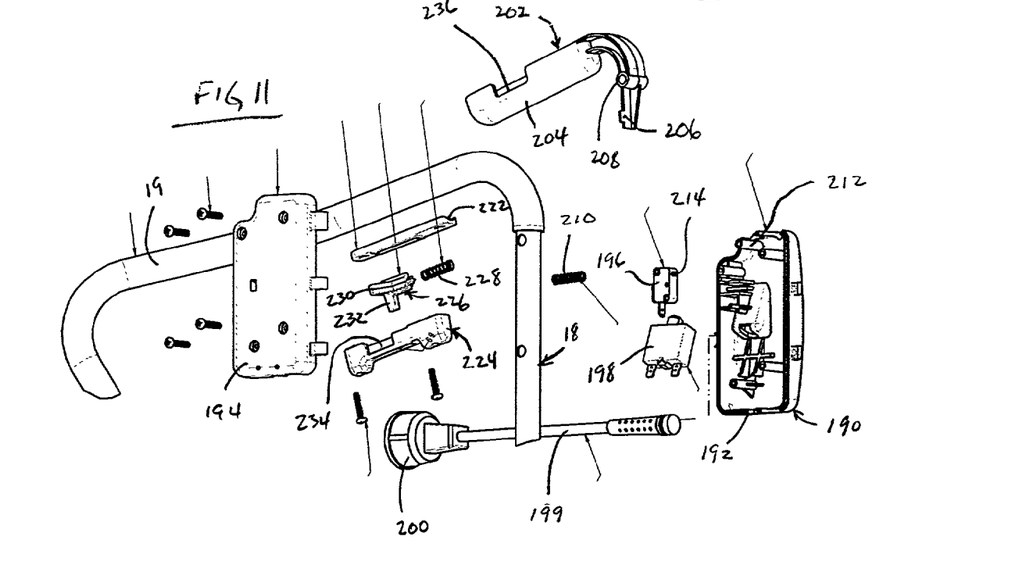
FIG. 11 is an exploded isometric view of the safety switch mechanism.

The safety switch mechanism includes an electrical housing 190 having a lower portion 192 and an upper portion 194. Mounted within the electrical housing is an electrical switch 196 and a circuit breaker 198. Also mounted to the electrical housing is an electrical cord 199 having a plug 200 for attachment to an electrical extension cord (not shown).

Also mounted to the electrical housing is a trigger lever 202, including a finger pad portion 204, a switch engagement arm portion 206, a pivot sleeve portion 208 and a biasing spring 210. The pivot sleeve portion is mounted to a shaft 212 of the electrical housing allowing the lever to be pivoted between an at-rest position to an activation position. When the finger pad portion 204 is moved upwardly by an operator's fingers, the arm portion 206 pivots inwardly to depress a spring loaded projection 214 extending from the electrical switch 196. The same movement also compresses the spring 210. When an operator releases the finger pad portion, the spring biases the trigger lever to the at-rest position and the motor is deactivated.

Figure 12:
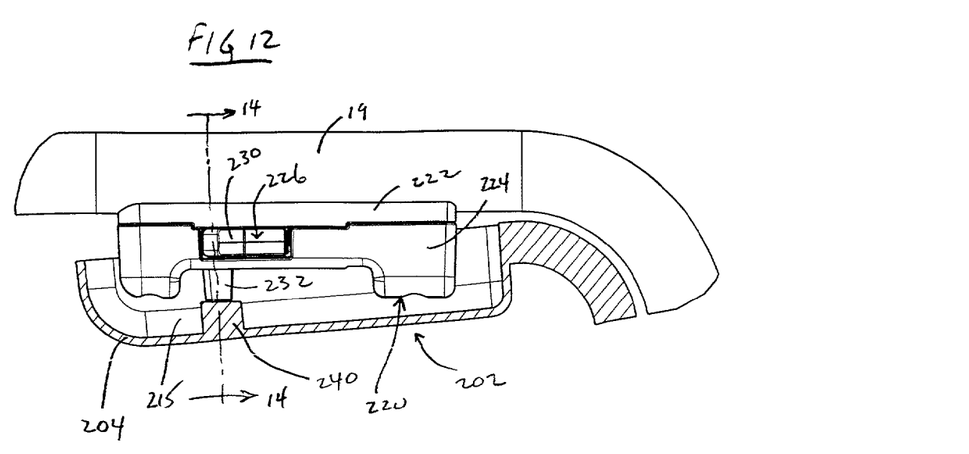
FIG. 12 is an elevation view, partially in section, of a trigger lever and a lever block assembly.
Figure 13:
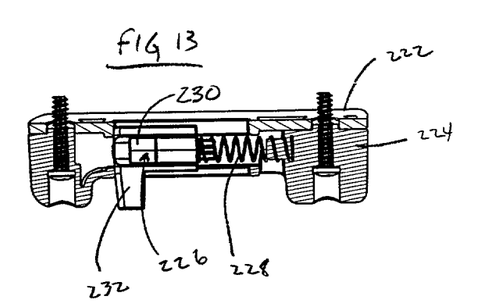
FIG. 13 is a sectional elevation view of the lever block assembly taken along line 13—13 of FIG. 14.
Figure 14:
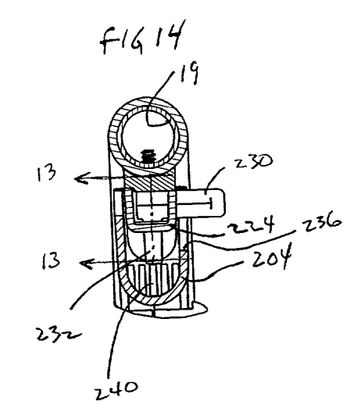
FIG. 14 is a sectional elevation view taken along line 14—14 of FIG. 12.

The trigger lever 204 has a hollow interior 215 for housing a lever block assembly 220. The lever block assembly comprises a mounting base 222, a base cover 224, which is also somewhat hollow, a safety block slide 226 and a biasing compression spring 228. The block slide includes an outward activation projection 230 and a downward abutment projection 232. The outward projection extends beyond a slot 234 in the base cover 224 and a slot 236 in the finger pad portion 204 of the trigger lever. In this arrangement, the slide 226 is trapped between the mounting base 222 and the base cover 224 and is constrained to slide laterally against the biasing spring 228 which is also constrained between the base and the cover.

In the hollow of the finger pad portion 204 is an upstanding abutment 240. The abutment 240 and the downward projection 232 of the slide make contact after just a slight rotation of the trigger lever 202 in a clockwise direction. This prevents the arm portion 206 from making contact and activating the switch projection 214 of the electrical switch 196. However, when the operator pushes the activation projection 230 of the slide 226 against the biasing spring 228, the abutment projection 232 slips off the abutment 240 of the trigger lever which allows, if there is also a simultaneous upward force on the finger pad portion 204 to have the trigger lever rotate upwardly, the arm portion 206 to engage and depress the projection 214 of the switch 196. The side of the upstanding abutment 240 prevents the slide 226 from returning leftwardly to its locking position. However as soon as the force on the trigger lever is released, the spring 210 biases the trigger lever downwardly (counterclockwise) to remove the upstanding abutment from interfering with movement of the slide. Then the slide under the influence of the spring 228 forces the slide leftwardly to again lock the trigger lever. In this fashion, the abutment projection 232 again aligns with the upstanding abutment 240 to prevent activation rotation of the trigger lever 202. Thus, in order to operate the tiller, the user must make a conscious movement of the slide 226 to the right while at the same time exerting upward pressure against the trigger lever 202. Without this two step movement, the tiller cannot be activated. Also, once activated, if the user releases the trigger lever the motor deactivates immediately.

In operation, application of the trigger lever 202 activates the motor 34 causing rotation of the gears in the transmission thereby causing the tines to be rotated. For purposes of storage or shipping the wheel assembly 20 may be lifted upwardly and restrained while the upper portion of the handle 18 may be rotated downwardly and also restrained.

What has been described is a quiet, strong and reliable electric garden tiller which is lightweight, compact and very easy to use. The tiller is also safe, easy to carry and foldable for storage and shipping. The tiller is also non-polluting, simply constructed and easily assembled.

The specification above describes in detail a preferred embodiment of the present invention. Other examples, embodiments, modifications and variations will, under both the literal claim language and the doctrine of equivalents, come within the scope of the invention defined by the appended claims. For example, a different shape for the main housing, for the fender or for the handle may be used and all are considered equivalent structures and will also come within the literal language of the claims. Still other alternatives, such as a different design for the transmission housing or for the bracket or for the safety switch mechanism or having a multiple speed control in the switch will also be equivalent as will many new technologies. There is no desire or intention here to limit in any way the application of the doctrine of equivalents nor to limit nor restrict the scope of the invention as defined by the claims.

The invention claimed is:

1. An electric garden tiller comprising:
   a main housing;
   an electric motor mounted within said housing;
   a transmission connected to said electric motor;
   a tine shaft connected to said transmission;
   a tine mounted to said tine shaft;
   a handle extending away from said electric motor;
   a sound insulative sleeve mounted around said electric motor;
   said main housing including a first portion having a first air opening;
   and a second portion having a second air opening;
   said insulative sleeve having an upper opening and a lower opening whereby ambient air is directed to said electric motor and exhausted;
   said transmission includes a two stage speed reduction arrangement through a small drive gear engaged to a large driven gear, said driven gear engaged to a worm shaft, said worm shaft engaged to a worm and said worm engaged to a driven worm wheel;
   said transmission including a sealed transmission housing formed of two mating aluminum parts; and,
   said transmission housing encloses said worm and said driven worm wheel;
   said main housing includes a wall for directing ambient air to the electric motor and isolating ambient air directed to the electric motor from air being exhausted from the electric motor.

2. An apparatus as claimed in claim 1 including:
   said second air opening in said lower front portion of said main housing.

3. An apparatus as claimed in claim 1 wherein
   said handle is mounted to said transmission housing.

4. An apparatus as claimed in claim 1 further comprising an operating safety means including a biased pivotal lever connected to said handle, a biased blocking slide connected to said handle and an electrical switch connected to said handle and being engageable by said pivotal lever.

5. An apparatus as claimed in claim 1 wherein:
   said handle is movable between a folded storage position and an extended use position; and including a set of wheels movable between a folded storage position and an extended use position.

6. An electric garden tiller comprising:
a sound insulative sleeve surrounding an electric motor mounted within a housing and a transmission connected to said electric motor;
a tine shaft having at least one tine mounted thereon and connected to said transmission;
a handle extending away from said electric motor;
said housing including a first portion having a first air opening and a second portion having a second air opening;
said insulative sleeve having an upper opening and a lower opening allowing ambient air to be directed to said electric motor and exhausted through said second air opening
said main housing includes a wall for directing ambient air to said electric motor and isolating ambient air directed to said electric motor from air being exhausted from said electric motor.

7. An electric garden tiller comprising:
a sound insulative sleeve surrounding an electric motor mounted within a housing and a transmission connected to said electric motor;
a tine shaft having at least one tine mounted thereon and connected to said transmission;
a handle extending away from said electric motor;
said housing including a first portion having a first air opening and a second portion having a second air opening;
said insulative sleeve having an upper opening and a lower opening allowing ambient air to be directed to said electric motor and exhausted through said second air opening;
a separation wall in said housing for directing ambient air to said electric motor and isolating ambient air directed to said electric motor from air being exhausted from said electric motor.

8. An electric garden tiller comprising:
a main housing;
an electric motor mounted within said housing;
a transmission connected to said electric motor;
a tine shaft connected to said transmission;
a tine mounted to said tine shaft;
a handle extending away from said electric motor;
a sound insulative sleeve mounted around said electric motor;
said main housing including a first portion having a first air opening;
and a second portion having a second air opening;
said insulative sleeve having an upper opening and a lower opening whereby ambient air is directed to said electric motor and exhausted;
said main housing includes a wall for directing ambient air to said electric motor and isolating ambient air directed to said electric motor from air being exhausted from said electric motor.

9. An apparatus as claimed in claim 8 wherein said handle is mounted to said transmission housing.

10. An apparatus as claimed in claim 8 including said second air opening in said lower front portion of said main housing.

11. An apparatus as claimed in claim 8 further comprising an operating safety means includes a biased pivotal lever connected to said handle, a biased blocking slide connected to said handle and an electrical switch connected to said handle and being engageable by said pivotal lever.

12. An apparatus as claimed in claim 8 wherein said handle is movable between a folded storage position and an extended use position and including a set of wheels movable between a folded storage position and an extended use position.

* * * * *